Aug. 3, 1943.   F. ATKINSON   2,325,901
FENDER DE-ICER
Filed April 11, 1942

Frank Atkinson,
INVENTOR.

BY
Victor J. Evans & Co.
ATTORNEYS

Patented Aug. 3, 1943

2,325,901

UNITED STATES PATENT OFFICE 2,325,901

FENDER DEICER

Frank Atkinson, Oxford, Ind.

Application April 11, 1942, Serial No. 438,650

1 Claim. (Cl. 180—1)

My invention relates to automotive vehicles, particularly the fenders thereof, and has among its objects and advantages the provision of an improved fender de-icer.

Figure 3:
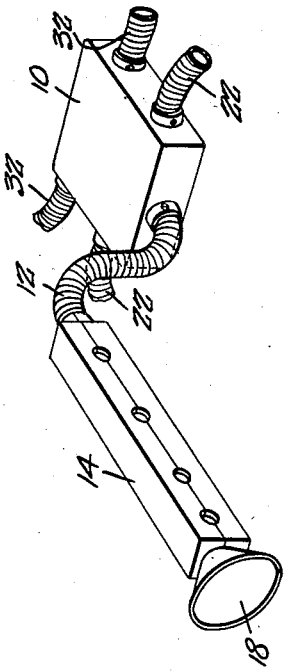
Figure 3 is a perspective view of a heater and distribution head for heated air conveyed to the fenders.
Figure 1:
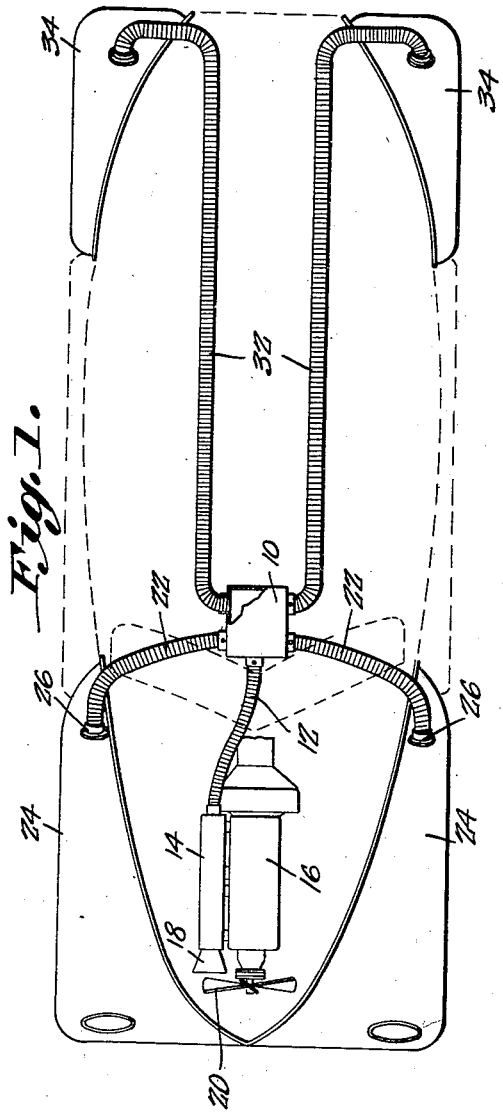
Figure 1 is a diagrammatic view of an automobile illustrating my invention applied to the fenders thereof.

In the embodiment selected for illustration, I make use of a warm air distributor 10 preferably mounted on the vehicle underneath the floor board thereof. This distributor is provided with a flexible warm air conduit 12 connected with a heater 14 secured to the exhaust manifold (not shown) of the motor 16. Such heaters are old and well-known in the art. The forward end of the heater is provided with a funnel 18 arranged closely adjacent the air circulating fan 20 so as to provide a forced circulation of air through the heater 14 for delivery to the distributor 10.

Figure 2:
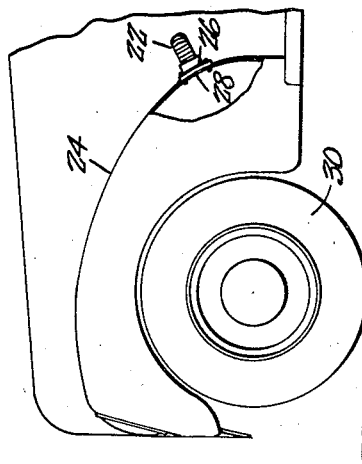
Figure 2 is an elevational view of one of the front fenders with a portion of the fender removed for the purpose of illustration.

Two flexible conduits 22 connect with the distributor 10 and lead to the front fenders 24. Figure 2 illustrates the connection between one of the conduits 22 and its respective fender, which connection comprises a flange 26 bolted or otherwise secured to the fender. An opening 28 is provided in the fender coaxially of the adjacent end of the conduit 22 so as to deliver warm air underneath the fender rearwardly of the front wheel 30.

Two conduits 32 communicate with the distributor 10 and connect with the rear fenders 34 in the manner of Figure 2. Thus the conduits 32 deliver warm air underneath the rear fenders 34 rearwardly of the rear wheels of the vehicle.

It frequently happens that large accumulations of ice form underneath the front and rear fenders of the vehicle. Such accumulations are apt to interfere with wheel operation, and large cakes of ice sometimes drop from the fenders onto the highway, which might cause accidents to other vehicles. In the instant case, warm air is forcibly circulated through the conduit system and is distributed to the respective fenders in such manner as to effectively de-ice the regions otherwise subjected to large accumulations of ice.

Without further elaboration, the foregoing will so fully illustrate my invention, that others may, by applying current knowledge, readily adapt the same for use under various conditions of service.

I claim:

In an automotive vehicle having an engine and front and rear fenders, an air heater arranged in heat transfer relationship with the engine, an air distributor lying rearwardly of said engine, a flexible conduit placing said air heater in communication with said air distributor, flexible conduits placing said air distributor in communication with the underside of the front fenders and rearwardly of the front wheels of the vehicle, and flexible conduits placing said air distributor in communication with the bottom side of said rear fenders rearwardly of the rear wheels of the vehicle.

FRANK ATKINSON.